(12) United States Patent
Stepanov et al.

(10) Patent No.: US 8,146,619 B2
(45) Date of Patent: Apr. 3, 2012

(54) FLUID CONTROL

(75) Inventors: Eugene V. Stepanov, Osseo, MN (US);
Douglas P. Goulet, Hanover, MN (US);
John Hunter, Rogers, MN (US)

(73) Assignee: IMI Vision Limited, Warwickshire (GB)

( * ) Notice: Subject to any disclaimer, the term of this patent is extended or adjusted under 35 U.S.C. 154(b) by 615 days.

(21) Appl. No.: 12/441,202

(22) PCT Filed: Sep. 14, 2007

(86) PCT No.: PCT/GB2007/003512
§ 371 (c)(1),
(2), (4) Date: Apr. 23, 2009

(87) PCT Pub. No.: WO2008/032101
PCT Pub. Date: Mar. 20, 2008

(65) Prior Publication Data
US 2010/0032596 A1    Feb. 11, 2010

(30) Foreign Application Priority Data

Sep. 15, 2006 (GB) .................................. 0618165.5

(51) Int. Cl.
*F16K 3/34* (2006.01)
(52) U.S. Cl. ................................................. 137/625.33
(58) Field of Classification Search ....... 137/625.33–625.39; 138/42; 366/340; 251/126
See application file for complete search history.

(56) References Cited

U.S. PATENT DOCUMENTS

| 3,780,767 | A | * | 12/1973 | Borg et al. | 137/625.3 |
| 4,327,757 | A | * | 5/1982 | Weevers | 137/625.3 |
| 4,976,462 | A | * | 12/1990 | Hirata et al. | 236/34.5 |
| 6,701,957 | B2 | * | 3/2004 | McCarty et al. | 137/625.3 |
| 6,782,920 | B2 | * | 8/2004 | Steinke | 137/625.3 |

FOREIGN PATENT DOCUMENTS

| WO | WO 01/84029 | 11/2001 |
| WO | WO 2004/001260 | 12/2003 |
| WO | WO 2004/106792 | 12/2004 |

OTHER PUBLICATIONS

Written Opinion for WO 2008/032101.

* cited by examiner

*Primary Examiner* — John Fox
(74) *Attorney, Agent, or Firm* — Stetina Brunda Garred & Brucker

(57) ABSTRACT

A valve having a trim comprising a plurality of a vortex flowpaths, each flowpath comprising a central vortex chamber and having three tangential inlet passages is provided. As the fluid flows through the inlet passages and enters the vortex chamber the flows start to turn and impinge upon one another, i.e., the flow entering via inlet passage will impinge upon the flow entering via inlet, the flow entering inlet will impinge on the flow entering inlet and the flow entering inlet will impinge on the flow entering inlet. As the flow entering vortex chamber impinges on another fluid flow as opposed to a wall of the flowpath the vortex can be used to create a flowpath with reduced erosion. The flow from the inlets combine in a radial flow within the vortex chamber and exit via the outlet which is substantially axial to the vortex chamber.

20 Claims, 7 Drawing Sheets

FLUID CONTROL

CROSS-REFERENCE TO RELATED APPLICATIONS

The present application claims priority to International Application No. PCT/GB2007/003512 which was filed on Sep. 14, 2007 and claims priority to Great Britain Patent Application No. 0618165.5 filed on Sep. 15, 2006.

STATEMENT RE: FEDERALLY SPONSORED RESEARCH/DEVELOPMENT

Not Applicable

BACKGROUND OF THE INVENTION

1. Technical Field of the Invention

This invention relates to the control and reduction of fluid pressure in valves for controlling fluid flow, especially but not exclusively severe service valves for use in power industries and oil and gas wells.

2. Description of the Related Art

The technology most widely used in severe service valves utilizes pressure letdown chambers consisting of one or more flow passages containing multiple orifice openings, labyrinths, or multiple, abrupt angular turn, passageways resulting in a staged pressure reduction. Alternatively, flow restrictions can be afforded by providing in the flow passage a region of reduced cross sectional area through which the fluid passes. As the fluid flows through the flow passage, the velocity is locally increased in that region thereby generating downstream turbulence which dissipates energy and reduces the pressure.

In the afore-mentioned control valves, dissipation of the energy of the flowing fluid is effected by frictional drag through tortuous passages or by successive abrupt contractions and expansions through smooth passages. Both of these types of valve work well for clean fluids but in a number of applications the fluid will contain contaminants, for example solid particles or droplets of liquid (hereinafter collectively referred to as particles), which will cause the passages to erode quickly. This is especially prevalent in the tortuous passage type which rely on a series of 90 degree turns at which particles will collide with the passage walls, thereby accelerating erosion, and in expansion / contraction valves as the contraction has an associated acceleration of both the flow and the particles entrained therein, the speed with which the particles collide with the passage walls also increases thereby accelerating erosion. The problem of erosion is particularly prevalent in well head choke valves, which are the primary shut-off/control valve on the top of an oil or gas well head. Separators for separating at least a portion of the particles are sometimes used, however with choke vales, as they are immediately atop the well head, if a means of separating particles is placed upstream of this valve then they are hard to service and result in overly complex systems.

The present invention attempts to mitigate problems with existing valves by providing a control valve with increased erosion resistance.

BRIEF SUMMARY OF THE INVENTION

According to a first aspect of the invention there is provided a valve trim for a pressure reduction valve, the trim comprising a plurality of high flow resistance flowpaths therethrough, each flowpath comprising a vortex chamber having at least three substantially tangential fluid inlet passages arranged at its circumference and at least one substantially axial outlet, said passages being arranged such that, in use, fluid entering the vortex chamber from each inlet passage impinges on fluid entering the vortex chamber from another inlet passage and thereafter fluid exits the chamber through said outlet.

As the fluid flows mutually impinge, particles in each fluid flow give up a large amount of their energy as they decelerate and then accelerate as they enter a flow in a different direction. The reduced energy of individual particles results in reduced erosion of the walls of the flowpath should they impinge thereon.

Preferably the vortex chamber is substantially cylindrical. Alternatively the vortex chamber may be polygonal, for example triangular or hexagonal. Where a polygonal vortex chamber is used the fluid inlet passages are tangential to the incircle of the polygon. Preferably the at least three flows of fluid entering the vortex chamber via the inlet passages combine to form a radial flow within the vortex chamber and exit together through the at least one axial outlet. The vortex has a lower pressure at its centre and it is in the lower pressure area of the vortex that the fluid flow exits resulting in a pressure drop across the flowpaths.

Preferably the three substantially tangential inlet passages to the vortex chamber are offset by an amount x along the radius of the vortex chamber towards said substantially axial outlet. By offsetting the inlet passages in this manner the fluid entering the vortex chamber via each inlet passage will impinge directly on the flow entering the vortex chamber via the next inlet passage without the flow first impinging on the walls of the vortex chamber, thus further reducing erosion Preferably the at least three inlet passages have a substantially 90 degrees bend upstream of the vortex chamber. The 90 degree bend creates a resistance to flow and by placing one inline in the inlet passage prior to the vortex chamber the pressure within the vortex chamber is further reduced thereby further decreasing erosion within the vortex chamber.

Preferably the valve trim is substantially tubular in form and said plurality of flowpaths pass through it. In a preferred arrangement the flow through the valve trim flows into the exterior circumferential surface and exits at the internal circumferential surface.

Preferably the trim comprises an upstream element and a downstream element. Preferably said upstream and downstream elements are substantially tubular in form.

In a preferred arrangement the trim comprises an inner cylindrical element and an outer cylindrical element. Preferably the outer circumferential surface of the inner element is substantially in contact with the inner circumferential surface of the outer element.

Preferably, where the outer element is the upstream element, the vortex chambers and inlet passages of each high resistance flowpath are at least partially formed in the outer circumferential surface of the inner element and an axial outlet passes from the vortex chamber through the inner element exiting at its interior circumferential surface.

Preferably a passageway is formed through the outer element leading to, and associated with, each of the at least three inlets passages. More preferably, and for the purpose referred to above, a substantially 90 degree bend in the inlet passage is formed by the passageway and associated inlet passage.

In one preferred arrangement the inner circumferential surface of the outer element encloses an open end of the vortex chamber formed in the outer circumferential surface of the inner element. In an alternative preferred arrangement the vortex chamber of each high resistance flowpath is at least partially formed in the inner circumferential surface of the outer element. In both embodiments the vortex chambers and flowpaths are preferably machined into the surfaces of said substantially tubular elements.

Preferably the inner tubular element is of a ceramic material, as used herein the term ceramic includes not only traditional inorganic non-metallic ceramics but also inorganic metallic materials, for example metal compound ceramics. Ceramic materials are particularly suitable as they can be very hard and have good wear properties. Preferably the ceramic material is a metal compound ceramic, for example a metal boride, nitride or carbide. Particularly suitable are tungsten carbides and aluminum magnesium borides. Alternatively the trim may be of an inorganic non-metallic ceramics material of a suitable hardness, for example silicon nitride or zirconium, in particular partially stabilized zirconium. The ceramic may comprise a single compound or a mixture of substances, for example a particular ceramic may be mixed with, or doped with, an element or compound to increase the wear characteristics of that ceramic, for example a Group 3, 4 or 5 elements or a nitride or boride thereof may be added. In particular $TiB_2$ may be used to increase the wear characteristics.

In one preferred arrangement the outer tubular element is metal. In an alternative preferred arrangement the inner and outer tubular elements are both of a ceramic material. Alternatively for applications with less erosion both inner and outer tubular elements may be metal.

According to a second aspect of the invention there is provided a valve having a trim according to the first aspect of the invention.

According to a third aspect of the invention there is provided a method of manufacturing a valve trim according the first aspect of the invention and having an inner tubular element of a ceramic material and a metallic outer tubular element, the method comprising the steps of:

forming the elements such that the outer diameter of the inner element is larger than the inner diameter of the outer element;

machining the vortex chambers and associated inlet passages into the external cylindrical surface of said inner element while the ceramic material is in its green state, and forming radial fluid flow passageways in the outer element;

firing the inner element to harden the green ceramic material;

heating the metal outer element causing it to expand such that it expands allowing the inner element to be positioned inside it;

aligning the passageways through the outer element and the inlet passages; and allowing the outer element to cool and contract around the inner element thereby creating an interference fit between the two elements and thus joining them together.

Preferably, after firing the inner element is allowed to cool prior to positioning it inside the outer element. Preferably, after the ceramic is hardened and prior to fitting the inner element inside the outer element, the outer surface of the inner element is ground to give the inner element the exact required external diameter.

According to a fourth aspect of the present invention there is provided a valve having a trim manufactured according to the third aspect of the invention.

According to a fifth aspect of the invention there is provided a method of manufacturing a valve trim according to the first aspect of the invention and having inner and outer tubular elements of a ceramic material comprising the steps of:

forming the inner and outer elements such that the outer diameter of the inner element is larger than the inner diameter of the outer element;

machining the vortex chambers, associated inlet passages and passageways into said inner and outer elements while the ceramic material is in its green state;

cooling the inner element causing it to contract thereby allowing it to be positioned inside the outer element; and allowing the inner sleeve warm and expand thereby creating an interference fit between the two elements and thus joining them together.

In one preferred method after joining the two elements together they are fired to harden the green ceramic material. In an alternative preferred method the elements are fired prior to joining them together. Where the elements are fired prior to joining them together the inner surface of the outer element and the outer surface of the inner element are preferably ground to give the joining faces of the two elements the required diameters.

In a preferred method the trim is re-fired after joining the inner and outer elements, thereby causing the ceramic of the two elements to bind.

According to a sixth aspect of the present invention there is provided a valve having a trim manufactured according to the fifth aspect of the invention.

BRIEF DESCRIPTION OF THE DRAWINGS

Specific embodiments of the invention will now be described, by means of example only, with reference to the accompanying drawings in which.

DETAILED DESCRIPTION OF THE INVENTION

Figure 1:
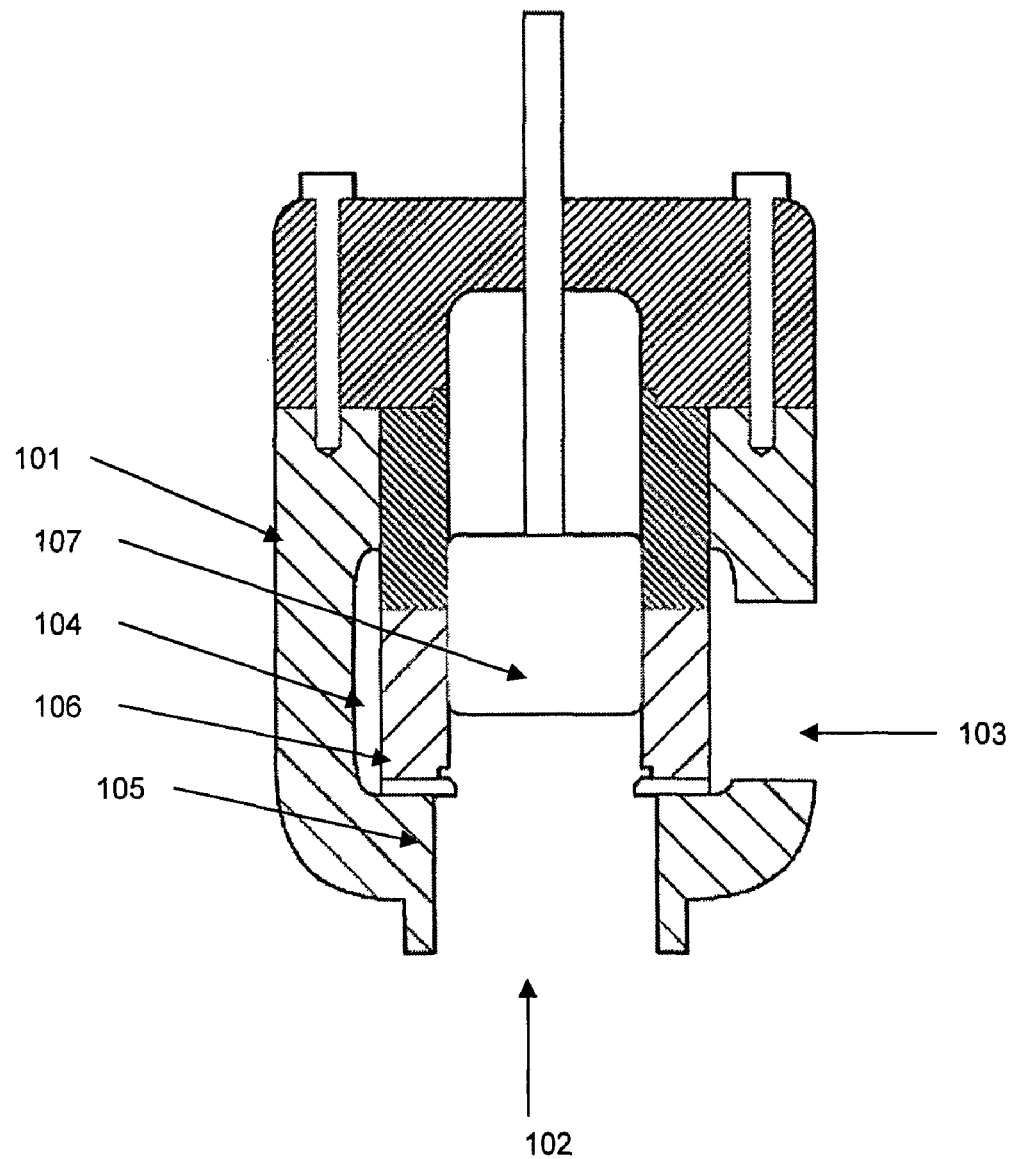
FIG. 1 is a vertical section showing the construction of a control valve incorporating a valve trim as common in the art.

Referring to FIG. 1 an example of a valve trim in a fluid control valve is shown as common in the art comprising a valve body 101 with a inlet 102 and outlet 103 in fluid communication with one another via a central chamber 104 containing seat ring 105, valve trim 106 and plug 107. When the valve plug 107 sits on the valve seat ring 105 no flow is permitted to pass through the valve. As the plug 107 is lifted in a controlled movement, flow is allowed to enter the valve through inlet 102 and passes through the valve trim 106, which reduces the fluid pressure, and out of outlet 103.

The trim 106 has a plurality of flowpaths therethrough which have a resistance to flow. The flow direction shown in this valve is known as over the plug flow and the invention will be described in relation to such a flow direction. Flow direction in the opposite direction, i.e. flow enters at 103 and exits at 102 is known as under the plug flow and the invention is equally applicable to such a flow.

Figure 2:
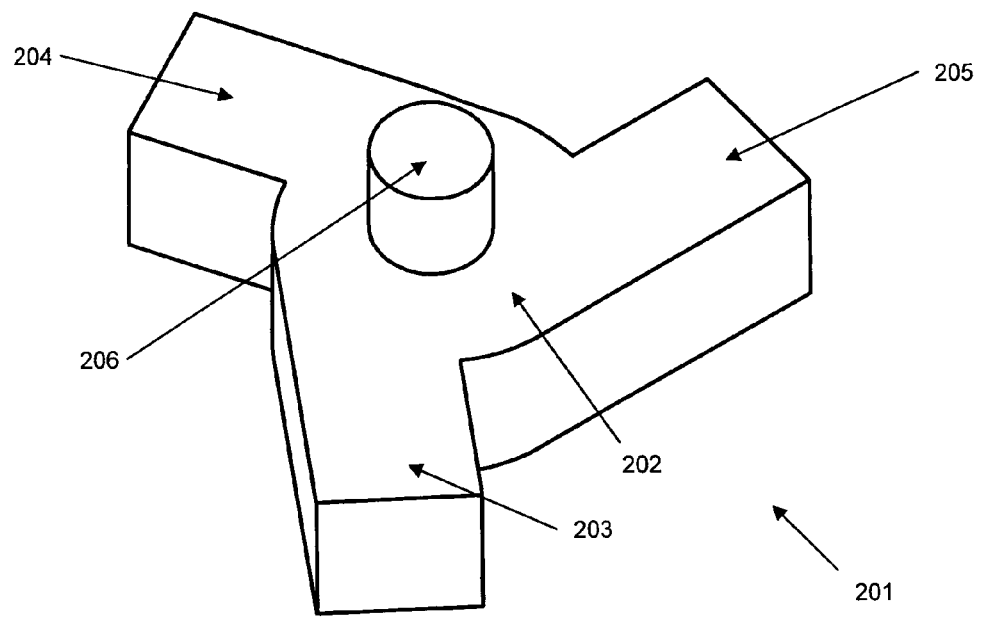
FIGS. 2 to 4 show vortex flowpaths according to the invention.

Referring to FIG. 2 a vortex flowpath 201 is shown comprising a central vortex chamber 202 and having three tangential inlet passages 203, 204, 205. As the fluid flows through the inlet passages 203, 204, 205 and enters the vortex chamber 202 the flows start to turn and impinge upon one another, i.e. the flow entering via inlet passage 203 will impinge upon the flow entering via inlet 204, the flow entering inlet 204 will impinge on the flow entering inlet 205 and the flow entering inlet 205 will impinge on the flow entering inlet 203. The vortex chamber 202 is substantially cylindrical in shape. In this arrangement where the flow enters strictly tangentially there will still be an element of erosion as the flow will be caused to partially change direction by the walls of the vortex chamber 202 prior to impinging on the inlet flow from the next inlet. The flow from the inlets 203, 204, 205 combine in a radial flow within the vortex chamber 202 and exit via the outlet 206 which is substantially axial to the vortex chamber. The outlet 206 may be any diameter up to the diameter of the vortex chamber 202.

Figure 3:
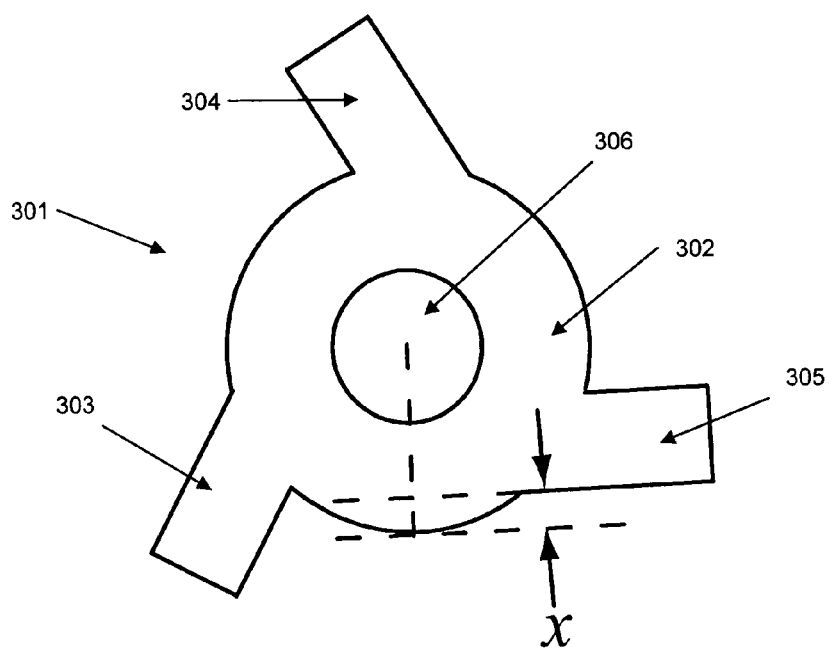

Referring now to FIG. 3 an improved flowpath 301 is shown in which the three substantially tangential inlets 303, 304, 305 to the vortex chamber 302 have been offset by an amount x along the radius of the vortex chamber 302 towards the outlet 306. By offsetting the inlets in this manner the fluid entering the vortex 302 via each inlet will impinge directly on the flow entering the vortex via the next inlet, i.e. the flow entering via inlet passage 303 will impinge upon the flow entering via inlet 304, the flow entering inlet 304 will impinge on the flow entering inlet 305 and the flow entering inlet 305 will impinge on the flow entering inlet 303, without the flow first impinging on the walls of the vortex chamber 302.

Figure 4:
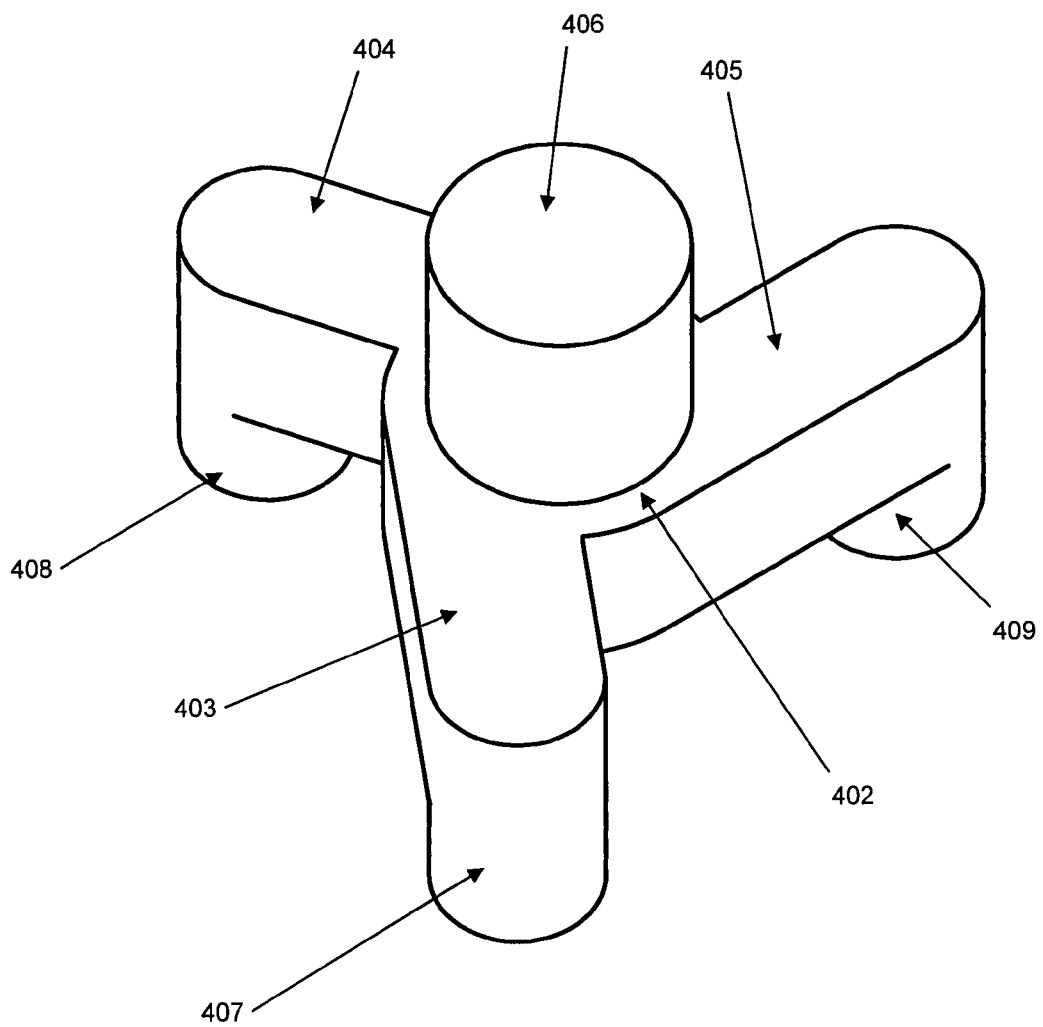

Referring to FIG. 4 a flowpath 401 is shown comprising a vortex chamber 402 into which three substantially tangential inlets 403, 404, 405 open. The arrangement of the inlets to the vortex chamber may be as described above with reference to either FIG. 2 or FIG. 3. Prior to entering the vortex chamber 402 fluid flows through passageways 407, 408, 409 and turns through 90 degrees as it enters the inlet passages 403, 404, 405. As with reference to FIGS. 2 and 3 the flow within the vortex chamber 402 takes a radial path and exits via the axial outlet 406.

Figure 5:
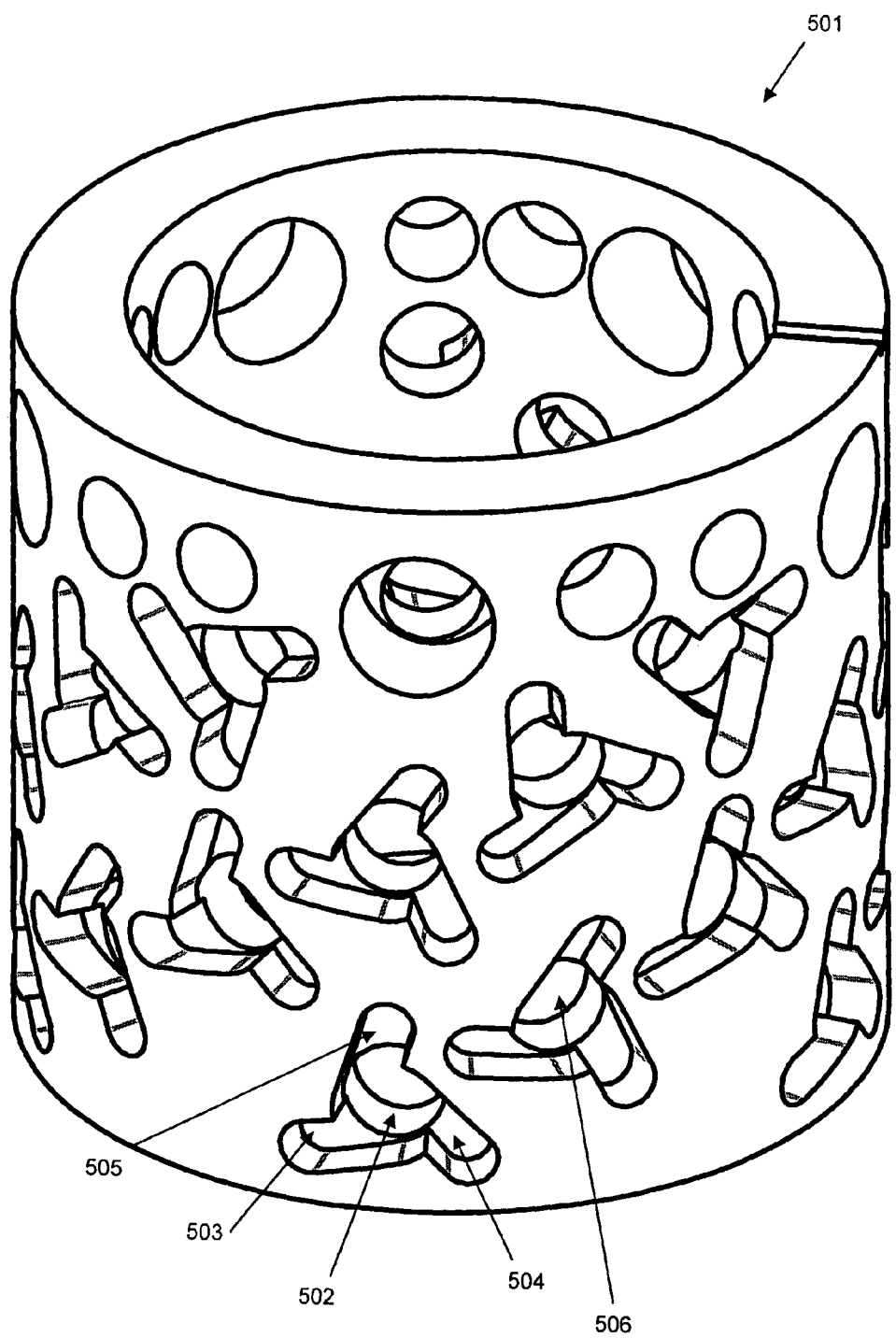
FIG. 5 shows an interior element of a valve trim according to the invention.
Figure 6:
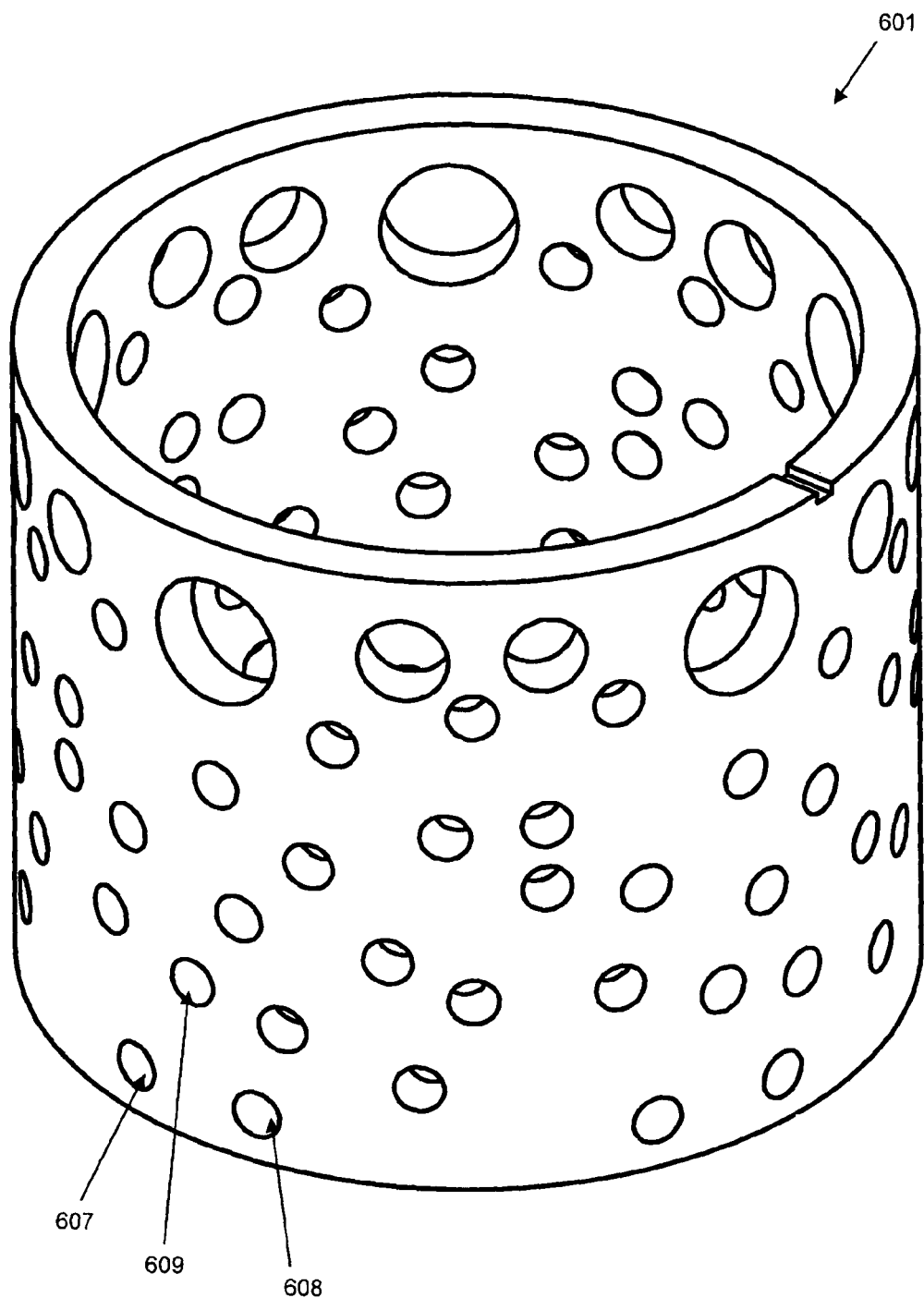
FIG. 6 shows an exterior element of a valve trim according to the invention.
Figure 7:
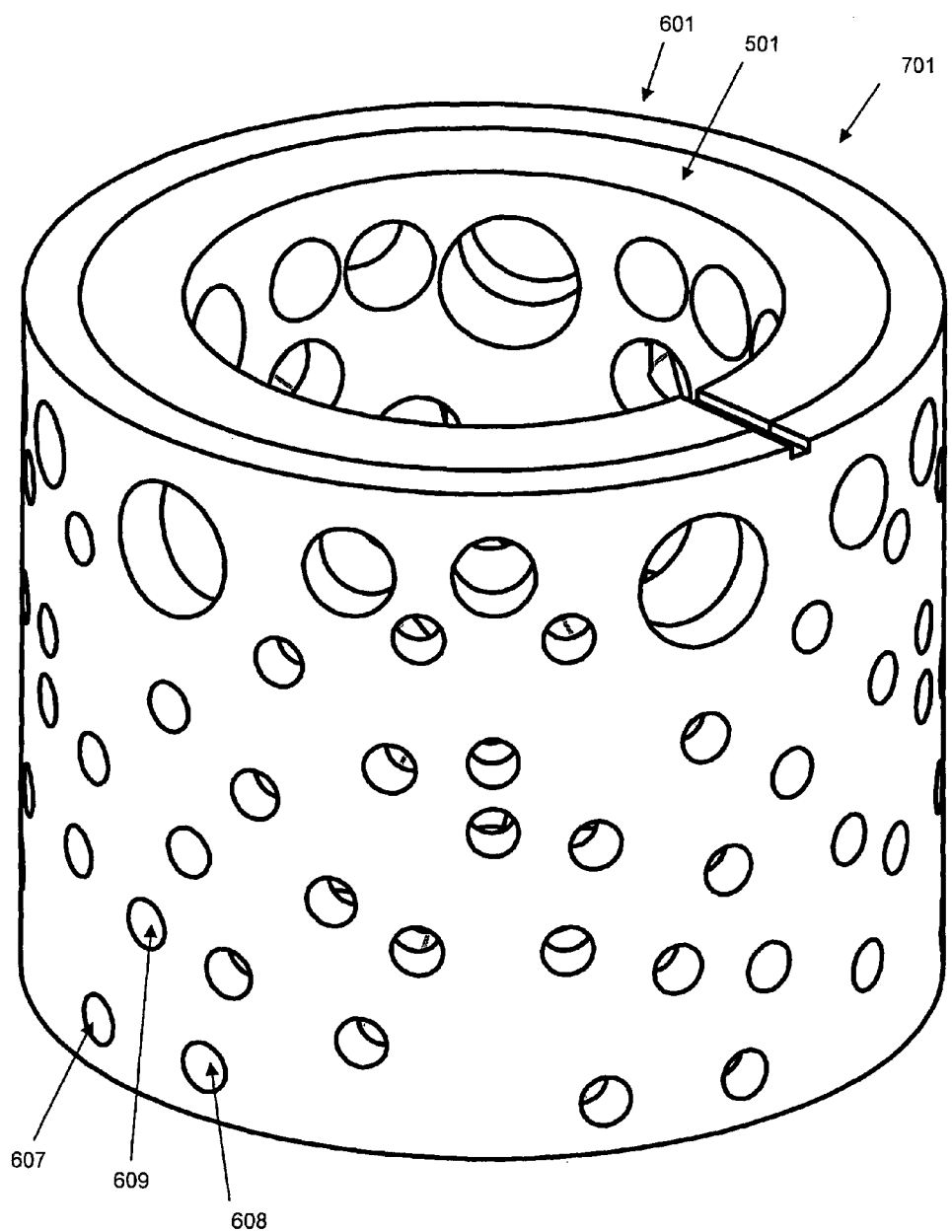
FIG. 7 shows an assembled view of a valve trim according to the invention.

Referring to FIGS. 5 to 7 a tubular inner element (501, FIG. 5) and a tubular outer element (601, FIG. 6) of a valve trim are shown. The inner element 501 has a plurality of vortex chambers 502 and associated inlets 503, 504, 505 machined into its outer surface. Extending from the centre of each vortex chamber through the inner element 501 to open at its interior surface is an outlet 506. The outer element 601 has a plurality of sets of passageways 607, 608, 609 extending through it such that if the inner element 501 were placed inside the outer element 601 the passageways 607, 608, 609 would align with the ends of the inlet passages 503, 504, 505 such that fluid entering the passageways 607, 608, 609 would pass through the outer element 601 and turn through 90 degrees to enter the inlet passages 503, 504, 505 prior to entering the vortex chamber 502 where they impinge on one another in a radial flow and exit through the inner element 501 via the outlet 506 axially to the vortex chamber. The inner element is made of material which is naturally hard in nature and thus has good wear properties. Ceramics in particular are suitable and particularly suitable are metal compound ceramics, for example a metal boride, nitride or carbide; amongst, these tungsten carbides and aluminum magnesium borides are preferred. When used, metal compound ceramics may comprise a single compound or a mixture of substances, for example a doping element may be added to increase the wear characteristics of the ceramic, for example a Group 3, 4 or 5 elements or a nitride or boride thereof. Particularly suitable is $TiB_2$. As an alternative to metal compound ceramics other materials of a suitable hardness may be used, for example zirconium, in particular partially stabilized zirconium. The outer element 601 may be of a similar material as the inner element 501 or, as the majority of the erosion occurs in the vortex chamber 502 within the inner element 501 the outer element 601 may be of a softer material, for example metal. Preferably the vortex chambers 502, inlet passages 503, 504, 505, and the outlets 506 are machined into the inner element 501. The vortex chambers 502 and inlet passages 503, 504, 505 are machined into the exterior surface of the inner element 501 such that they create recesses therein and the outlet 506 is machine from the centre of the vortex recess through the element such that fluid may flow therethrough. The sets of passageways 607, 608, 609 are machined through the outer element. When ceramics are being used the machining of the inner and outer elements to create the flowpaths is done when the ceramic is in its green state, i.e. before the ceramic has been hardened, so that conventional tools can be used.

Once the inner 501 and outer 502 elements have been manufactured they can be assembled together to form a valve trim 701. Depending on the materials being used this can be done either when the ceramic is in its green state or after it has been fired to harden it.

The inner 501 and outer 601 elements are manufactured such that the interior diameter of the outer element 601 is marginally smaller than the exterior diameter of the inner element 501 such that under normal conditions it is not possible to insert the inner element 501 into the outer element 601. To enable this to occur, if both parts are ceramic, the inner element 501 is cooled to cause it to contract. As the inner diameter of the outer element 601 is only marginally smaller than the outer diameter of the inner element 501 as the inner element 501 contracts it becomes possible to locate it inside the outer element 601. The elements 501, 601 are then aligned so that the passageways 607, 608, 609 are aligned with the inlet passages 503, 504, 505 and the assembled valve trim is allowed to warm up. As the inner element 501 warms it expands and contacts the outer element 601 whereby an interference fit is created between the two. Where both the inner 501 and outer 601 elements are of ceramic materials there are two alternative methods of assembly of the valve trim. The first method involves hardening the ceramic before assembly and the second involves hardening the ceramic after assembly. If the elements are hardened before assembly then it may be necessary to grind the external surface of the inner element 501 and the internal surface of the outer element 601 to the required dimensions for a good interference fit. When the valve trim is fired after assembly to harden the ceramic it is not necessary to grind the mating surfaces as the ceramic of the two components is softer and will conform to one another as the inner element 501 expands into contact with the outer element 601. The ceramic of the two elements fuses during the firing process.

When the inner element 501 is a ceramic and the outer element 601 is a metal then the process is slightly different. In this case the inner element 501 is fired to harden the ceramic and once hardened is then ground to give the required external dimension.

The outer element 601 is then heated thereby causing it to expand such that its inner diameter becomes larger than the outer diameter of the inner element 501. The inner element is placed within the outer element and they are then aligned so that the passageways 607, 608, 609 are aligned with the inlet passages 503, 504, 505 and the assembled valve trim is allowed to cool. As it cools the metal outer element contracts and an interference fit is effected between the inner and outer elements.

In both arrangements, i.e. a metal or a ceramic outer element 601, a chamfer may be provided on both the end of both the inner 501 and the outer 601 elements to assist the insertion of one within the other.

In both arrangements, i.e. with a metal or a ceramic outer element 601, a witness mark may be provided at the end of both the inner 501 and the outer 601 elements to assist alignment of one within the other.

Although the valve trim is described as being manufactured in two parts, it could comprise three parts, i.e. an external element having sets of passageways therethrough, a central element having a vortex chamber and associated inlet passages extending therethrough and an inner element having the outlet extending therethrough.

Figure 8:
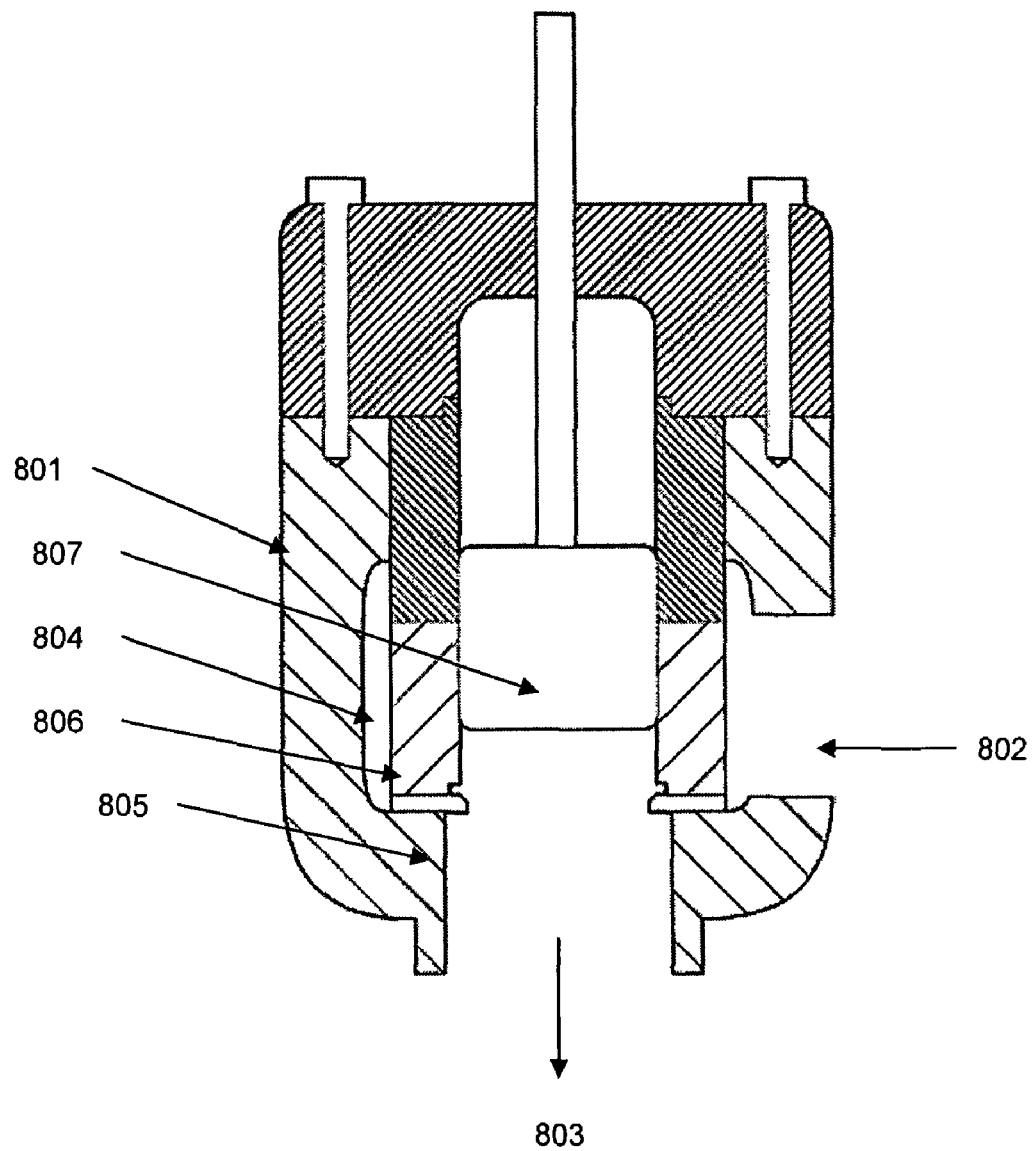
FIG. 8 shows a cross section of a valve according to the invention.

Referring to FIG. 8 a fluid control valve with a trim as described above is shown. The valve comprises a valve body 801 with a inlet 802 and outlet 803 in fluid communication with one another via a central chamber 804 containing seat ring 805, valve trim 806 and plug 807. When the valve plug 807 sits on the valve seat ring 805 no flow is permitted to pass through the valve. As the plug 807 lifts up in a controlled movement flow is allowed to enter the valve through inlet 802 and passes through the exposed flowpaths of the valve trim 806, which reduces the fluid pressure with minimum erosion, and out of outlet 803. The trim 806 has a plurality of flowpaths therethrough as described above with relation to FIGS. 2 to 4 and is constructed as described in relation to FIGS. 5 to 7.

Other embodiments of the valve and valve trim, for example a combination of the flowpath described herein with other known flowpaths will be apparent to those skilled in the art.

The invention claimed is:

1. A valve trim for a pressure reduction valve, the trim comprising an upstream element and a downstream element, said upstream and downstream elements collectively defining a plurality of high flow resistance flowpaths therethrough, each flowpath comprising a vortex chamber having at least three substantially tangential fluid inlet passages arranged at its circumference and at least one substantially axial outlet, said passages being arranged such that, in use, fluid entering the vortex chamber from each inlet passage impinges on fluid entering the vortex chamber from another inlet passage and thereafter fluid exits the chamber through said outlet.

2. A valve trim according to claim 1 wherein the at least three flows of fluid entering the vortex chamber via the inlet passages combine to form a radial flow within the vortex chamber.

3. A valve trim according to claim 1 wherein the chamber is substantially cylindrical.

4. A valve trim according to claim 1 wherein the three substantially tangential inlet passages to the vortex chamber are offset by an amount x along the radius of the substantially cylindrical vortex chamber towards said substantially axial outlet.

5. A valve trim according to claim 1 wherein each of the inlet passages has a substantially 90 degree bend upstream of the vortex chamber.

6. A valve trim according to claim 1 wherein the trim is substantially tubular.

7. A valve trim according to claim 6 comprising a substantially tubular inner element and a substantially tubular outer element, the inner tubular element and outer tubular element each defining a respective inner circumferential surface and a respective outer circumferential surface, and wherein the outer circumferential surface of the inner element is substantially in contact with the inner circumferential surface of the outer element.

8. A valve trim according to claim 7 wherein the inlet passages and the vortex chamber of each high resistance flowpath are at least partially formed in the outer circumferential surface of the inner element and an axial outlet passes from the vortex chamber through the inner element exiting at its interior inner circumferential surface.

9. A valve trim according to claim 8 wherein a passageway is formed through the outer element leading to, and associated with, each of the at least three inlet passages.

10. A valve trim according to claim 8 wherein the inner circumferential surface of the outer element encloses an open end of the vortex chamber formed in the outer circumferential surface of the inner element.

11. A valve trim according to claim 8 wherein the vortex chamber of each high resistance flowpath is at least partially formed in the inner circumferential surface of the outer element.

12. A valve trim according to claim 8 wherein the vortex chambers and inlet passages are machined into the surfaces of said substantially tubular elements.

13. A valve trim according to claim 8 wherein the inner tubular element and the outer tubular element are of a metal.

14. A valve trim according to claim 8 wherein the inner tubular element is of a ceramic material and the outer tubular element is of a metal.

15. A valve trim according to claim 14 wherein the ceramic is $AlMgB_{14}$.

16. A valve trim according to claim 14 wherein the ceramic contains an admixture of a material selected from the group including: Group 3, 4 and 5 elements and nitrides and borides thereof.

17. A valve trim according to claim 16 wherein $TiB_2$ is added to the ceramic.

18. A valve trim according to claim 8 wherein the inner and outer tubular elements are both of a ceramic material.

19. A method of manufacturing a valve trim having an inner tubular element and an outer tubular element collectively defining a plurality of high flow resistance flowpaths through the inner tubular element and the outer tubular element, each flowpath comprising a vortex chamber having at least three substantially tangential fluid inlet passages arranged at its circumference, and at least one substantially axial outlet, said passages being arranged such that, in use, fluid entering the vortex chamber from each inlet passage impinges on fluid entering the vortex chamber from another inlet passage and thereafter fluid exists the chamber through said outlet, the method comprising the steps of:

forming the inner tubular element out of a ceramic material and the outer tubular element out of a metallic material, the inner tubular element having an external cylindrical surface defining an outer diameter being is larger than an inner diameter defined by the outer tubular element;

machining the vortex chambers and associated inlet passages into the external cylindrical surface of said inner tubular element while the ceramic material is in its green state, and forming radial fluid flow passageways in the outer tubular element;

firing the inner tubular element to harden the green ceramic material;

heating the outer tubular element causing it to expand such that it expands allowing the inner tubular element to be positioned inside it;

aligning the passageways through the outer tubular element and the inlet passages; and allowing the outer tubular element to cool and contract around the inner tubular element thereby creating an interference fit between the two elements and thus joining them together.

20. A method of manufacturing a valve trim having an inner tubular element and an outer tubular element collectively defining a plurality of high flow resistance flowpaths through the inner tubular element and the outer tubular element, each flowpath comprising a vortex chamber having at least three substantially tangential fluid inlet passages arranged at its circumference, and at least one substantially axial outlet, said passages being arranged such that, in use, fluid entering the vortex chamber from each inlet passage impinges on fluid entering the vortex chamber from another inlet passage and thereafter fluid exists the chamber through said outlet, the method comprising the steps of:

forming the inner tubular element and the outer tubular element out of a ceramic material, the inner tubular element having an external cylindrical surface defining an outer diameter being larger than an inner diameter defined by the outer tubular element;

machining the vortex chambers, associated inlet passages and passageways into said inner and outer tubular elements while the ceramic material is in its green state;

cooling the inner tubular element causing it to contract thereby allowing it to be positioned inside the outer tubular element; and warming the inner tubular element causing the inner tubular element to expand thereby creating an interference fit between the two elements and thus joining them together.

* * * * *